United States Patent [19]

Fitzgerald et al.

[11] Patent Number: 5,798,402
[45] Date of Patent: *Aug. 25, 1998

[54] FLUORINATED SULFONE MELT ADDITIVES FOR THERMOPLASTIC POLYMERS

[75] Inventors: Patrick Henry Fitzgerald, Pitman, N.J.; Kimberly Gheysen Raiford; Edward James Greenwood, both of Hockessin, Del.

[73] Assignee: E. I. du Pont de Nemours and Company, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 579,043

[22] Filed: Dec. 21, 1995

[51] Int. Cl.$^6$ .................. C08K 5/41; C08K 5/02
[52] U.S. Cl. .................. 524/167; 524/316; 524/319; 524/462; 525/199
[58] Field of Search .................. 524/167, 316, 524/319, 462; 525/199

[56] References Cited

U.S. PATENT DOCUMENTS

| | | | |
|---|---|---|---|
| 3,940,435 | 2/1976 | Hiestand | 560/150 |
| 4,029,585 | 6/1977 | Dettre et al. | 252/8.6 |
| 5,145,727 | 9/1992 | Potts et al. | 428/198 |
| 5,149,576 | 9/1992 | Potts et al. | 428/198 |
| 5,178,931 | 1/1993 | Perkins et al. | 428/198 |
| 5,178,932 | 1/1993 | Perkins et al. | 428/198 |

FOREIGN PATENT DOCUMENTS

| | | |
|---|---|---|
| 2 516 920 A | 5/1983 | France . |
| 20 52 579 A | 10/1970 | Germany . |
| 56-169666 A | 12/1981 | Japan . |
| 3041160 | 2/1991 | Japan . |
| 5148454 | 6/1993 | Japan . |
| WO 92/18569 | 10/1992 | WIPO . |
| WO 95/01396 | 1/1995 | WIPO . |

*Primary Examiner*—Jeffrey T. Smith

[57] ABSTRACT

Compositions and processes for imparting repellency to low surface tension fluids in thermoplastic polymers, said compositions containing compounds of formulae $R_fSO_2(CH_2)_nC(O)_2OR$, $RSO_2(CH_2)_nC(O)OR_f$ and $R_fSO_2R$ wherein $R_f$ is $F(CF_2)_x$—$(CH_2)_m$ wherein x is 4 to 20 and m is 2 to 6, R is a saturated aliphatic hydrocarbon with an average carbon chain length of 12 to 66 carbons; and n is 1 to 4 are disclosed.

15 Claims, No Drawings

FLUORINATED SULFONE MELT ADDITIVES FOR THERMOPLASTIC POLYMERS

FIELD OF THE INVENTION

This invention relates to compositions having and a process for imparting superior repellency of low surface tension fluids to thermoplastic polymers, in particular fibers, fabrics, nonwovens, films and molded articles, by the addition of the esters of perfluoroalkylsulfonyl-carboxylic acids or other sulfone-containing compounds to the polymer.

BACKGROUND OF THE INVENTION

Thermoplastic polymer fibers are frequently treated with fluorochemical compounds in order to affect the surface characteristics of the fiber, for example to improve water repellency or to impart stain or dry soil resistance. Most frequently, fluorochemical dispersions are applied topically to the fabrics made from these fibers by spraying, padding or foaming, followed by a drying step to remove water.

For example, a method is known for obtaining dry soil resistance and nonflame propagating characteristics in a textile fiber by applying topically aqueous dispersions of a variety of fluorinated esters derived from perfluoroalkyl aliphatic alcohols of the formula $C_nF_{2n+1}(CH_2)_mOH$ where n is from about 3 to 14 and m is 1 to 3, together with mono- or polycarboxylic acids which contain from 3 to 30 carbons and can contain other substituents. The fluorinated esters include, among others, a perfluoroalkylethyl stearate corresponding to "ZONYL" FTS, as well as perfluoroalkylethyl diesters made from dodecanedioic acid or tridecanedioic acid.

It is well recognized that the process of manufacturing thermoplastic polymeric fibers and fabrics could be simplified and significant capital investment could be eliminated if the topical application were replaced by incorporating a fluorochemical additive into the polymer melt prior to the extrusion of the fiber. The difficulty has been in finding suitably effective fluorochemical additives.

Thermoplastic polymers include, among others, polyolefins, polyesters, polyamides and polyacrylates. Polyolefins, and in particular polypropylene, are frequently used for disposable nonwoven protective garments, particularly in the medical/surgical field, in part because of a polyolefin's inherent water-repellency. However, polyolefins are not inherently good repellents for other lower surface tension fluids frequently encountered in the medical field such as blood and isopropyl alcohol. To get around this deficiency, fluorochemical emulsions are applied topically to these fabrics.

The requirements of an additive suitable for incorporating into a polyolefin melt include, besides the ability to repel low surface tension fluids at a low concentration of the additive, a satisfactory thermal stability and low volatility to withstand processing conditions. Preferably the compound will migrate to the surface of the fiber so as to minimize the amount of additive needed for adequate repellency. While this migrating can often be enhanced by post-extrusion heating of the fiber, it is more preferable for the migrating to occur without the need for this heating step. This requirement for mobility in the polymeric fiber in turn tends to limit the size of the fluorochemical molecule, and effectively eliminates from consideration high molecular weight polymeric fluorochemical additives.

The general concept of incorporating fluorochemical additives into a polyolefin fiber melt is known, but the difficulty in finding suitable effective additives has limited the application of this concept. Many of the past efforts to evaluate such fluorochemical additives have been aimed at improving other properties of the polyolefin, and do not teach methods of improving its repellency to low surface tension fluids.

Nonwoven composite structures are known consisting in part of two or more melt-extruded nonwoven layers, at least one of which includes an additive which imparts to the surface at least one characteristic different than the surface characteristics of the polymer alone as a result of preferential migration of the additive to the surface without the need for post-formation treatment of any kind. Examples of the additive-including layer include polypropylene modified by commercially available fluorochemical additives, including "ZONYL" FTS above.

U.S. Pat. No. 5,178,931 and U.S. Pat. No. 5,178,932 disclose specific nonwoven laminiferous and composite structures respectively, consisting in part of three melt-extruded nonwoven layers, the second of which includes an additive which imparts alcohol repellency as a result of preferential migration of the additive to the surface without the need for post-formation treatment of any kind, and where at least one of the first and third layers has been treated by topical application of an agent to change its characteristics in some way. Examples of the additive included in the second layer include commercially available fluorochemicals, including "ZONYL" FTS.

Soil resistant polymeric compositions are known which are prepared by melt extrusion with a nonpolymeric fluorochemical dispersed throughout the polymer. The polymers used include polypropylene, polyethylene, polyamide and polyester, and the fluorochemical used is a perfluoroalkylstearate, in particular "ZONYL" FTS.

In summary, while the prior art discloses numerous examples of polyolefin fibers containing a fluorochemical additive incorporated at the melt stage to alter the surface characteristics of the extruded fiber, much of this is directed at soiling and staining resistance or water repellency. Those references which were aimed at imparting alcohol repellency to polyolefin fabrics employ "ZONYL" FTS. A need exists to achieve superior repellency to low surface tension fluids and superior product efficiency. The fluorinated compounds of the present invention meet this need.

SUMMARY OF THE INVENTION

The present invention comprises a composition having repellency to low surface tension fluids comprising a material prepared by forming a mixture of a polymer selected from the group consisting of polyolefin, polyamide, polyester and polyacrylate and a fluorochemical comprising a compound selected from the group consisting of monomeric fluorinated sulfone-containing compounds of formulae I, II and III

| | |
|---|---|
| $R_fSO_2(CH_2)_nC(O)OR$ | I |
| $RSO_2(CH_2)_nC(O)OR_f$ | II |
| $R_fSO_2R$ | III | wherein $R_f$ is $F(CF_2)_x$—$(CH_2)_m$ wherein x is from about 4 to about 20, and m is from about 2 to about 6; and R is a saturated aliphatic hydrocarbon having from about 12 to about 66 carbon atoms; and n is 1 to about 4; and melt extruding the mixture.

The present invention further comprises a process for imparting superior repellency of low surface tension fluids to thermoplastic polymer articles comprising forming a mixture prior to article formation of a polymer and an effective amount of a monomeric fluorinated sulfonyl-containing compound of formulae I, II or III as defined above and melt extruding the mixture. The polymer is in a molten, granular pelletized, powdered or other appropriate form. This process is particularly suitable for imparting repellency of low surface tension fluids to polyolefin articles, and may be used either with or without post-extrusion heating of the article to promote movement of the additive to the article surface. "Article" is used herein to include filaments, fibers, nonwoven webs, nonwoven fabrics, films and molded articles.

The present invention further comprises an extruded filament, fiber, film, molded article, and nonwoven web or fabric, each comprising at least one thermoplastic polymer and at least one compound of formula I, II, or III as defined above or mixtures thereof.

DETAILED DESCRIPTION OF THE INVENTION

Superior repellency of low surface tension fluids can be imparted to thermoplastic polymer articles of manufacture such as filaments, fibers, nonwovens, films or molded articles, by the addition of certain monomeric fluorinated sulfone-containing compounds to the polymer or polymer melt, i.e. prior to article formation. The present invention comprises a process for imparting repellency of low surface tension fluids to thermoplastic polymer articles, a composition formed by melt extruding polymers containing such additives and the extruded filament, fiber, film, nonwoven web or fabric, or molded article.

The term "low surface tension fluids" is used herein to mean fluids having a surface tension of less than about 50 dynes/cm ($50\times10^{-7}$ newton meter).
Examples of such fluids include alcohols, blood and certain body fluids.

The highly efficient additives useful for the compositions and processes of this invention comprise the following groups of fluorinated sulfone-containing compounds:

I. Fluorocarbonsulfonyl esters of the formula I:

$$R_fSO_2(CH_2)_nC(O)\text{—}OR \qquad \text{I}$$

II. Fluorocarbonsulfonyl esters of the formula II:

$$RSO_2(CH_2)_nC(O)\text{—}OR_f \qquad \text{II}$$

and

III. Fluorocarbonsulfones of formula III $$R_fSO_2R \qquad \text{III}$$

wherein $R_f$ is $F(CF_2)_x\text{—}(CH_2)_m$ wherein x is from about 4 to about 20, and m is from about 2 to about 6; R is an aliphatic hydrocarbon having from about 12 to about 66 carbon atoms; and n is 1 to about 4. Preferably R is a linear or branched alkyl group having from about 14 to about 50 carbon atoms.

In one embodiment of this invention, $R_f$ in the above formulae is $F(CF_2)_x\text{—}(CH_2)_m$ wherein x is from about 4 to about 20, preferably 4 to 10, and m has a value of 2 to 6. Especially preferred for $R_f$ is a composition wherein the chain length distributionis as follows:

x=4 or less, 0–10% by weight
x=6, 50–70% by weight
x=8, 20–40% by weight
x=10, 5–15% by weight
x=12 or greater, 0–5% by weight.

This composition range, when m=2, and x has an average value of about 7, is hereinafter referred to as Telomer BL. The formula $R_fOH$ wherein $R_f$ has this composition is referred to as Telomer BL alcohol.

R is an aliphatic hydrocarbon with an average carbon chain length of from about 12 to about 66 carbons, preferably a straight chain or branched alkyl of about 14 to about 50 carbons. One commercial source of alcohols corresponding to R-OH which provide a source of R is Petrolite Corporation, Polymers Division Headquarters, 6910 E. 14th Street, Tulsa, Okla., U.S.A. 74112 under the trade name "UNILIN". The approximate R ranges of "UNILIN" 350, 425, 550 and 700 are 12 to 50, 14 to 58, 16 to 56 and 14 to 66, respectively. The average chain lengths for "UNILIN" 350, 425, 550 and 700 are about 24, 32, 40 and 48, respectively. Alcohols providing a source of R in the lower end of the preferred range of linear $C_{14}$ to $C_{22}$ include stearyl alcohols available from The Proctor & Gamble Company, Cincinnati, Ohio, "EPAL" available from Albermarle Corporation, Baton Rouge, La., or "NAFOL" available from Vista Chemicals, Austin, Tex.

There are various methods by which the above compounds can be prepared, and the inventive compositions and processes are not limited to a particular method of preparation. A (perfluoroalkylthio)propionic acid is prepared by acidification of "ZONYL" FSA with hydrochloric acid to precipitate an oil which is then dried. "ZONYL" FSA is the lithium salt of $Rf(CH_2)_2S\text{—}(CH_2)_2COOH$ available from E. I. du Pont de Nemours and Company, Wilmington, Del. The acid is then reacted with aqueous hydrogen peroxide in acetic acid. Water is then added, followed by mixing and filtering to obtain the (perfluoroalkylsulfonyl)propionic acid. The acid is then esterified by heating with an appropriate alcohol in the presence of a catalytic amount of phosphorus acid and boric acid to obtain compounds of formula I. Additional details of ester preparation are in U.S. Pat. No. 3,940,435, herein incorporated by reference.

One method of preparing formula II compounds involves first reacting an alkyl bromide with 3-mercaptopropionic acid in the presence of potassium carbonate. The 3-(alkylthio)propionic acid is isolated and oxidized to the corresponding sulfone with hydrogen peroxide in acetic acid. The acid is then esterified by heating with Telomer BL alcohol in the presence of a catalytic amount of phosphorous acid and boric acid.

Formula III compounds are made by reacting an alkylthiol with $F(CF_2)_x\text{—}(CH_2)_2\text{—}I$ (Telomer B iodide) in the presence of potassium carbonate. The sulfide is oxidized to the sulfone by reaction with hydrogen peroxide in acetic acid.

The compounds useful in this invention can be mixed with thermoplastic polymers by adding them to granular, pelletized or powdered forms of the polymers and mixing, i.e. rolling, agitating or compounding, the mixture to achieve a uniform mixture, followed by melt extruding the mixture. Alternatively the compounds used in this invention can be mixed into a molten polymer which is then melt extruded. The thermoplastic polymer can be a polyolefin, polyester, polyamide, or polyacrylate. Preferably the thermoplatic polymer is a polyolefin, mixture or blend of one or more polyolefins, a polyolefin copolymer, mixture of polyolefin copolymers, or a mixture of at least one polyolefin and at least one polyolefin copolymer. The thermoplastic polymer is more preferably a polyolefin polymer or copolymer wherein the polymer unit or copolymer unit is ethylene, propylene or butylene or mixture thereof. Thus the polyolefin is polyethylene, polypropylene, polybutylene or a blend thereof or copolymers thereof.

The amount of the fluorinated compound to be added to the thermoplastic polymer is preferably between 0.1 and about 5% by weight of the polymer. Amounts above this range can be used but are unnecessarily expensive in relation to the benefit received. Preferably the amount added is sufficient to provide a fluorine content of from about 200 µg/g to about 25,000 µg/g in the final filament, fiber, nonwoven web or fabric, film or molded article. The blend is then melted and extruded into filaments, fibers, nonwoven webs or fabrics, films or molded articles using known methods.

Extrusion is used to form various types of nonwovens. In particular, extrusion is used to form a melt blown nonwoven web of continuous and randomly deposited microfibers having an average diameter of approximately 0.1 to 10 microns, preferably in the range of about 3 to 5 microns. The melt extrusion is carried out through a die at a resin flow rate of at least 0.1 to 5 grams per minute per hole, with the microfibers being randomly deposited on a moving support to form the web.

In the above melt blowing process, polymer and a compound of the present invention are fed into an extruder where it is melted and passed through a die containing a row of tiny orifices. As the polymer emerges from the die, it is contacted by two converging, high-velocity hot air streams, which attenuate the polymer into a blast of fine, discontinuous fibers of 0.1 to about 10 microns in diameter. The useful polymer throughputs or flow rates range from 0.1 to 5 grams per minute per hole. Typical gas flow rates range from 2.5 to 100 pounds per minute per square inch ($1.72 \times 10^5$ to $6.89 \times 10^5$ Pa) per minute of gas outlet area. The air temperature ranges from about 400° F. (204° C.) to 750° F. (399° C.). Cooling air then quenches the fibers, and they are deposited as a random, entangled web on a moving screen which is placed 6 to 12 inches (15.2 to 30.5 cm) in front of the blast of fibers.

Melt blowing processes are described in further detail in articles by V. A. Wente, "Superfine Thermoplastic Fibers", Industrial and Engineering Chemistry, Vol. 48(8), pp 1342–1346 (1956); and by R. R. Buntin and D. T. Lohkamp, "Melt Blowing—A One-step Web Process for New Nonwoven Products", Journal of the Technical Association of the Pulp and Paper Industry, Vol. 56(4), pp 74–77 (1973); as well as in U.S. Pat. No. 3,972,759 to R. R. Buntin. The disclosures of these documents are hereby incorporated by reference.

The unique properties of a melt blown nonwoven web comprised of a random array of fine, entangled fibers include very large surface areas, very small pore sizes, moderate strength and light weight fabric structure. These properties make the nonwoven webs particularly suitable for such applications as medical fabrics where barrier properties as well as breathability and drape are important.

Extrusion is also used to form polymeric films. In film applications, a film forming polymer is simultaneously melted and mixed as it is conveyed through the extruder by a rotating screw or screws and then forced out through a slot or flat die, for example, where the film is quenched by a variety of techniques known to those skilled in the art. The films optionally are oriented prior to quenching by drawing or stretching the film at elevated temperatures.

Molded articles are produced by pressing or injecting molten polymer from a melt extruder as described above into a mold where the polymer solidifies. Typical melt forming techniques include injection molding, blow molding, compression molding and extrusion, and are well known to those skilled in the art. The molded article is then ejected from the mold and optionally, heat-treated to effect migration of the polymer additives to the surface of the article.

An optional heating or annealing step is conducted but is not required. The polymer melt or extruded fiber, nonwoven web or fabric, film, or molded article is heated to a temperature of from about 25° C. to about 150° C. The heating in some cases may improve the effectiveness of the fluorochemical additive in imparting repellency.

The compositions of the present invention are useful in various filaments, fibers, nonwoven webs or fabrics, films and molded articles. Examples include fibers for use in fabrics and carpets, nonwoven fabrics used in protective garments used in the medical/surgical field, and molded plastic articles of many types. The processes of the present invention are useful for imparting repellency of low surface tension fluids in various thermoplastic polymer articles such as filaments, fibers, nonwoven webs or fabrics, films and molded articles.

Example 1

Synthesis of $R_fSO_2(CH_2)_nC(O)OR$ wherein $R_f$ is an aliphatic fluorocarbon radical of formula $F(CF_2)_x(CH_2)_m$ wherein the average value of x is 7, m is 2, and R has an average value of 24 carbons and n is 2.

Step A 3-(2-Perfluoroalkylethylsulfonyl)propionic Acid 3-(2-Perfluoroalkylethylthio)propionic acid was prepared from "ZONYL" FSA by acidification with hydrochloric acid to precipitate an oil and drying of the oil at 100°–110° C. under vacuum. To a solution of 359.5 g of 3-(2-perfluoroalkylethylthio) propionic acid in 270 gm of acetic acid and 360 gm isopropanol was added 209 gm of 30% hydrogen peroxide (aqueous). The stirred mixture rose in temperature spontaneously from 23° C. to 64° C. over about 10 minutes. When the temperature began to fall, heat was supplied to hold the temperature at 80° C. for 8 hours and then the reaction mixture was drowned into 2 liters of warm (50° C.) water and mixed, with shear, to break up the gel that resulted. The suspension was filtered, and the cake was washed with water, with dilute sodium thiosulfate solution, and again with water. The cake was dried at 105°–110° C. under vacuum to yield 315 gm of product.

Step B

Ester of 3-(2-perfluoroalkylethylsulfonyl)proponic acid

The ester was prepared by heating the acid with an equimolar amount (or up to 10% excess) of "UNILIN " 350 alcohol in the presence of a catalytic amount of phosphorous acid and a trace of boric acid. The reaction was run at 104°–165° C. until it appeared complete by Nuclear Magnetic Resonance Spectroscopy, typically from 30 to 50 hours.

Step C

Preparation of the polymer blend

Uniform mixtures of the fluorochemical additives produced in Examples 1–33 together with a polyolefin were prepared by combining them and rolling the mixture for about 24 hours. In particular, for the compound of Example 1, a uniform mixture of 8.2 g (0.6 weight %) of finely ground compound of Example 1, 1348 g of polyolefin, including in part Escorene PD3746G (Exxon Chemical Americas, P.O. Box 3273, Houston, Tex. 77001) polypropylene resin having a melt flow rate of approximately 1000 was prepared by rolling the mixture for 24 hours. The fluorine concentration in the mixture was calculated to be 1980 µg/g fluorine.

Actual fluorine concentration in the nonwoven web was 1760 µg/g fluorine.

Step D
Melt blown web formation

Melt blown nonwoven webs were prepared from the above mixtures using a 6-inch (15 cm) melt blowing pilot unit at a polymer feed rate of about 0.4 gram/minute/hole. The polymer blends were fed into the extruder having three barrel zones at temperatures ranging from 175° C. to 250° C. The temperature at the die was from 200° C. to 260° C. and the air temperature at the die varied from 200° C. to 270° C. The die tip gap was 0.060 inches (0.15 cm) and the primary air pressure was 2.6 psi ($17.9 \times 10^3$ Pa). The webs were formed on a drum coated with "TEFLON" at an output of 0.4gram/hole/minute and collected on a take-up roll operating at 30 feet/minute(914 cm/minute) which resulted in the fabrics having a basis weight of 1.0 oz./square yard (34 gm/square meter). The fabrics were tested using the following method. Data is summarized in Table 2.

Test Method

The water repellent properties of the monomeric fluorinated sulfone-containing compounds were measured using an isopropyl alcohol/water test and are expressed in terms of a percent isopropyl alcohol rating. Webs that resisted penetration of a 100% isopropyl alcohol/0% water solution (lowest surface tension fluid) after 1–2 minutes were given the highest rating of 100. Webs that were only resistant to a 100% water/0% isopropyl alcohol solution after 1–2 minutes were given the lowest rating of 0. Table 1 lists ratings that correspond to other isopropyl alcohol/water mixtures used in this test. The rating for a given fabric corresponds to the lowest surface tension fluid (greatest % isopropyl alcohol/water solution) that does not wet the fabric after 1–2 minutes.

TABLE 1

IPA Ratings

| RATING | % Isopropyl alcohol/% water (vol/vol) |
|---|---|
| 100 | 100/0 |
| 90 | 90/10 |
| 80 | 80/20 |
| 70 | 70/30 |
| 60 | 60/40 |
| 50 | 50/50 |
| 40 | 40/60 |
| 30 | 30/70 |
| 20 | 20/80 |
| 10 | 10/90 |

To evaluate in-process repellency, the webs were rated immediately after exiting the melt blown line and after heating at 80° C. (176° F.) for 15 seconds and at 104° C. (220° F.) for 15 seconds.

Examples 2–33

Additional compounds were prepared and evaluated using the procedure of Example 1, and illustrated a variety of options for the non-fluorinated moiety. The resulting data are listed in Table 2. The esters are identified by the R group of formula I. Alcohols corresponding to R—OH were available commercially. The "UNILIN" alcohols were linear $C_{24}$–$C_{50}$ mixtures from Petrolite Corp., Tulsa , Okla. ("NILIN" 350 averaged about 25 carbons, "UNILIN" 425 averaged about 32 carbons, and "UNILIN" 550 averaged about 38 carbons.) Octadecanol-tech was a stearyl alcohol mixture purchased from Aldrich Co., Milwaukee, Wis. "NAFOL" 1822 was a mixture of octadecanol, eicosanol, and docosanol from Vista Chemical Co., Austin, Tex. Oleyl alcohol and n-hexanol were purchased from Aldrich. "EPAL" 16 was n-hexadecanol from Albermarle Corp., Baton Rouge, La.)

The use of branched, rather than linear, alcohols (Examples 29–30) gave repellency, but was less efficient than the linear materials as illustrated below. Jarcol I-24 was a branched, $C_{24}$ alcohol from Jarchem Industries, Newark, N.J. Partially alkoxylated alcohols (Examples 31–33) were also effective as illustrated by the data. "IGEPAL" CA-210, ethoxylated nonylphenol was obtained from Aldrich Co., Milwaukee, Wis. and "WITCONOL" APM, a propoxylated alcohol, was obtained from Witco Corp., New York, N.Y.

Comparative Examples A–D

Comparative example A was prepared similarly to the procedure of Example 1, except that the oxidation reaction was carried out with cooling (30°–45° C.), and run for only an hour, and with only 42% of the peroxide used in Example 1. This yielded the sulfoxide moiety, rather than the preferred sulfone. Comparative Examples B–D were made similarly to the procedure of Example 1, except that the amidations were conducted without acid catalyst. The resulting data are listed in Table 2.

TABLE 2

| Ex- amp le | Ester | µg/g* | $R_f$** | Isopropyl Alcohol Rating | | |
|---|---|---|---|---|---|---|
| | | | | As Made | 15 sec @ 80° C. | 15 sec @ 104° C. |
| 1 | "UNILIN" 350 | 1760ª | L | 70–80 | 90 | 90 |
| 2 | "UNILIN" 350 | 1440ᵇ | L | 60 | 80 | 80 |
| 3 | "UNILIN" 350 | 1660ª | N | 50 | 80 | 80 |
| 4 | "UNILIN" 350 | 1180ᵇ | N | 40 | 50 | 50 |
| 5 | Octadecanol-tech | 1730ª | N | 50 | 80–90 | 90 |
| 6 | Octadecanol-tech | 1370ᵇ | N | 40 | 70 | 70 |
| 7 | Octadecanol-tech | 1570ª | L | 80 | 90 | 80–90 |
| 8 | Octadecanol-tech | 1320ᵇ | L | 70 | 80 | 80 |
| 9 | "NAFOL" 18-22 | 1760ª | L | 80 | 80–90 | 90 |
| 10 | "NAFOL" 18-22 | 1440ᵇ | L | 70–80 | 80 | 80 |
| 11 | "UNILIN" 350 | 1610ª | S | 60 | 70 | 70 |
| 12 | "UNILIN" 350 | 1260ᵇ | S | 40 | 50 | 40 |
| 13 | "UNILIN" 350 | 1370ª | $C_6F_{13}$ | 70 | 80–90 | 80 |
| 14 | "UNILIN" 350 | 1060ᵇ | $C_6F_{13}$ | 50 | 70 | 50 |
| 15 | "NAFOL" 18-22 | 1840ª | L | 80 | 90 | 90 |
| 16 | "NAFOL" 18-22 | 1290ᵇ | L | 60–70 | 80 | 70 |
| 17 | Oleyl | 1770ª | L | 60 | 70 | 60 |
| 18 | Octadecyl-tech | 1660ª | $C_6F_{13}$ | 70 | 70 | 80 |
| 19 | Octadecyl-tech | 1740ª | L | 70 | 90 | 80 |
| 20 | Octadecyl-tech | 1200ᵇ | L | 40 | 60 | 40 |
| 21 | "EPAL" 16 | 1730ª | L | 80 | 80 | 80 |
| 22 | Hexanol | 1230ª | L | 40 | 50 | 40 |
| 23 | "UNILIN" 350 | 1570ª | $C_4F_9$ | 70 | 70 | 60 |
| 24 | "UNILIN" 350 | 1600ª | L | 70–80 | 90 | 70 |
| 25 | "UNILIN" 425 | 2210ª | L | 90 | 100 | 100 |
| 26 | "UNILIN" 425 | 1320ᵇ | L | 60–70 | 90 | 70 |
| 27 | "UNILIN" 550 | 2070ª | L | 70 | 90–100 | 100 |
| 28 | "UNILIN" 550 | 1380ª | L | 50 | 80 | 80 |
| 29 | "JARCOL" I-24 | 1640ª | L | 50 | 60 | 50 |
| 30 | "JARCOL" I-24 | 1590ᵇ | L | 50 | 50 | 50 |
| 31 | "IGEPAL" CA-210 | 1360ª | L | 60 | 60 | 50 |
| 32 | "IGEPAL" CA-210 | 1270ᵇ | L | 50 | 50 | 50 |
| 33 | "WITCONOL" APM | 1850ª | L | 40 | 40 | 40 |
| A | "UNILIN" 350 | 1190ª | S | 30 | 30 | 30 |

TABLE 2-continued

| Example | Ester | μg/g* | $R_f$** | As Made | Isopropyl Alcohol Rating 15 sec @ 80° C. | 15 sec @ 104° C. |
|---|---|---|---|---|---|---|
| B | Octadecyl Amine | 1710ᵃ | L | 30 | 40 | 70 |
| C | Octadecyl Amine | 1190ᵇ | L | 30 | 30 | 60 |
| D | Dihexadecyl Amine | 980ᵃ | L | 30 | 30 | 30 |

ᵃ*Indicates amount from a theoretical loading of 1980 μg/g.
ᵇIndicates amount from a theoretical loading of 1500 μg/g.
**$R_f$ is a distribution or mixture of $C_nF_{2n+1}$ compounds
L is $C_4F_9$ to $C_8F_{17}$
S is $C_4F_9$ to $C_{18}F_{37}$
N is $C_8F_{17}$ to $C_{12}F_{25}$ The excellent performance of Examples 1–33 in Table 2 were also compared to that of a simple stearate ester of Telomer Alcohol below:

| | μg/g F | As made | Isopropyl Alcohol Rating 24 hrs @ 60° C. | $R_f$ |
|---|---|---|---|---|
| "ZONYL" FTS | 1910 | 30 | 80–90 | S |
| "ZONYL" FTS | 2426 | 40 | 80 | S |

The above results showed the clear advantage of the inventive compositions over the comparative examples A–D and "ZONYL" FTS, the advantages showing up immediately and over time. A related advantage for the inventive compositions was their lower fluorine loss during melt extrusion processing.

Example 34

Synthesis of $RSO_2(CH_2)_nC(O)OR_f$ wherein $R_f$ is an aliphatic fluorocrbon radical of formula $F(CF_2)_x(CH_2)_m$ wherein the average value of x is 7, m is 2, and R is about 18 carbons and n is 2.

Step A
3-(Octadecylthio)propionic acid

To a solution of 86.8 gm (0.25 mole) octadecyl bromide, 29.2 gm (0.275 mole) 3-mercaptopropionic acid and 90.0 gm isopropanol at 80° C. was added 95.0 gm (0.275 mole) 40% aqueous potassium carbonate solution dropwise. The mixture was heated at 80° C. for 8 hours and then cooled to 60° C. After adding 125.0 gm water and 36.8 gm of 30% hydrochloric acid solution, the mixture was slowly heated to 94° C. while distilling aqueous isopropyl alcohol from the reaction. The product separated as an oil from the aqueous phase. It was isolated using a separatory funnel and washed with hot water. Upon cooling, the product solidified as a light tan waxy solid. It was dried in a vacuum oven at 50° C. to yield 91.35 gm (98%)

Step B
3-(Octadecylsulfonyl)propionic acid

To a solution of 35.9 gm (0.10 mole) 3-(octadecylthio) propionic acid, 85.0 gm isopropyl alcohol and 65.0 gm acetic acid was added dropwise 29.5 gm (0.26 mole) of 30% hydrogen peroxide (aqueous). The temperature of the reaction was slowly raised and held at 70° C. for 10 hours. The solid product was filtered under vacuum, washed with water, a solution of 8.75 gm sodium sulfite in 175.0 gm water and then rinsed with water. The product was dried in a vacuum oven at 50° C. to yield 37.0 gm (94.8%) of a solid white product. The structure was confirmed by proton NMR and IR spectroscopy.

Step C
Perfluoroalkylethyl ester of (3-octadecylsulfonyl) propionic acid

A mixture of 31.25 gm (0.08 mole) 3-(octadecylsulfonyl) propionic acid, 36.0 gm (0.082 mole) perfluoroalkylethyl alcohol and catalytic amounts of phosphorous and boric acids was heated at 140° C. for approximately 36 hours. The reaction was determined to be complete by IR spectroscopy and GC analysis. The tan-colored, waxy solid product was isolated and weighed 56.10 gm (86.0%). The product was tested in polypropylene melt blown nonwoven webs prepared as described in Example 1 and using the test method previously described. The resulting data is in Table 3.

Example 35

Synthesis of $RfSO_2R$ wherein $R_f$ is an aliphatic fluorocarbon radical of formula $F(CF_2)_x(CH_2)_m$ where the average value of x is 7, m is 2, and R is about 18 carbons.

Step A
1-(2-perfluoroalkylethylthio)octadecane

To a solution of 38.0 gm (0.130 mole) n-octadecyl mercaptan, 63.75 gm (0.125 mole) 2-perfluoroalkylethyl iodide and 75.0 gm isopropanol at 80° C. was added 24.2 gm (0.07 mole) 40% aqueous potassium carbonate solution dropwise. The mixture was heated at 80° C. for 32 hours and then cooled to room temperature. After adding 100.0 gm water, the solid product was isolated by vacuum filtration. It was dried in a vacuum oven at 50° C. to yield 83.2 gm (99%) of a tan-colored, waxy solid.

Step B
1-(2-perfluoroalkylethylsulfonyl)octadecane

To a solution of 32.7 gm (0.05 mole) 1-(2-perfluoroalkylethylthio)octadecane, 87.0 gm isopropyl alcohol and 65.0 gm acetic acid was added dropwise 14.7 gm (0.13 mole) of 30% hydrogen peroxide (aqueous). The temperature of the reaction was slowly raised and held at 80° C. overnight. The reaction mixture was poured into 200 gm tap water and the solid product that separated was filtered under vacuum, washed with water, a solution of 4.0 gm sodium thiosulfate in 80.0 gm water and then rinsed with water. The product was dried in a vacuum oven at 50° C. to yield 32.3 gm (94.0%) of a light yellow solid. It was recrystallized from heptane. The structure was confirmed by proton NMR and tested in polypropylene melt blown nonwoven webs prepared as in Example 1 and using the test method previously described. The resulting data is in Table 3.

TABLE 3

| Example | μg/g F | $R_f$ | As made | Isopropyl Alcohol Rating 15 sec @ 80° C. | 15 sec @ 104°C. |
|---|---|---|---|---|---|
| 34 | 1590 | L | 80 | 90 | 90 |
| 35 | 1700 | L | 80 | 90 | 90 |

The above results showed the excellent performance of compounds of formulae II and III of the present invention.

What is claimed is:

1. A composition having repellency to low surface tension fluids comprising a material prepared by forming a mixture of a polymer selected from the group consisting of polyolefin, polyamide, polyester and polyacrylate and a fluorochemical compound selected from the group consisting of formula III $R_fSO_2R$  III wherein $R_f$ is $F(CF_2)_x$—$(CH_2)_m$ wherein x is from about 4 to about 20, and m is from about 2 to about 6; and R is a aliphatic hydrocarbon having from about 12 to about 66 carbon atoms; and melt extruding the mixture.

2. The composition of claim 1 wherein the polymer is selected from the group consisting of polyolefin, mixture of polyolefins, polyolefin copolymer, mixture of polyolefin copolymers, and mixture of at least one polyolefin and at least one polyolefin copolymer.

3. The composition of claim 2 wherein the polyolefin has a polymer unit which is ethylene, propylene, butylene, or a mixture thereof.

4. The composition of claim 1 wherein $R_f$ is $F(CF_2)_x(CH_2)_m$ wherein x is from about 4 to about 10 and is an average of about 7, and m is 2.

5. The composition of claim 1 wherein the fluorochemical is present in an amount of from about 0.1% to about 5% by weight of polymer.

6. The composition of claim 1 having a fluorine content of from about 200 μg/g to about 25,000 μg/g.

7. An article selected from the group consisting of an extruded filament, fiber, nonwoven web, nonwoven fabric, film and molded article prepared from the composition of claim 1.

8. A composition having repellency to low surface tension fluids comprising a material prepared by forming a mixture of a polymer selected from the group consisting of polyolefin, polyamide, polyester and polyacrylate and a fluorochemical compound selected from the group consisting of formula I $$R_fSO_2(CH_2)_nC(O)OR \qquad I$$

wherein $R_f$ is $F(CF_2)_x$—$(CH_2)_m$ wherein x is from about 4 to about 20, and m is from about 2 to about 6; and R is a aliphatic hydrocarbon having from about 24 to about 66 carbon atoms; and n is 1 to about 4; and melt extruding the mixture.

9. A composition having repellency to low surface tension fluids comprising a material prepared by forming a mixture of a polymer selected from the group consisting of polyolefin, polyamide, polyester and polyacrylate and a fluorochemical compound selected from the group consisting of formula II $$RSO_2(CH_2)_nC(O)OR_f \qquad II$$

wherein $R_f$ is $F(CF_2)_x$—$(CH_2)_m$ wherein x is from about 4 to about 20, and m is from about 2 to about 6; and R is a aliphatic hydrocarbon having from about 12 to about 66 carbon atoms; and n is 1 to about 4; and melt extruding the mixture.

10. The composition of claim 8 or 9 wherein the polymer is selected from the group consisting of polyolefin, mixture of polyolefins, polyolefin copolymer, mixture of polyolefin copolymers, an mixture of at least one polyolefin and at least one polyolefin copolymer.

11. The composition of claim 10 wherein the polyolefin has a polymer unit which is ethylene, propylene, butylene, or a mixture thereof.

12. The composition of claim 8 or 9 wherein $R_f$ is $F(CF_2)_x(CH_2)_m$ wherein x is from about 4 to about 10 and is an average of about 7, and m is 2.

13. The composition of claim 8 or 9 wherein the fluorochemical is present in an amount of from about 0.1% to about 5% by weight of polymer.

14. The composition of claim 8 or 9 having a fluorine content of from about 200 μg/g to about 25,000 μg/g.

15. An article selected from the group consisting of an extruded filament, fiber, nonwoven web, nonwoven fabric, film and molded article prepared from the composition of claim 8 or 9.

* * * * *